United States Patent [19]

Berriman et al.

[11] Patent Number: 5,609,026

[45] Date of Patent: *Mar. 11, 1997

[54] ENGINE NOX REDUCTION

[75] Inventors: Lester P. Berriman, Irvine; John M. Zabsky, Santa Ana; James W. Davis, Rancho Mirage; William M. Hylton, Sacramento, all of Calif.

[73] Assignee: Kleenair Systems, Inc., Irvine, Calif.

[ * ] Notice: The portion of the term of this patent subsequent to Jul. 6, 2010, has been disclaimed.

[21] Appl. No.: 83,657

[22] Filed: Jun. 28, 1993

Related U.S. Application Data

[63] Continuation-in-part of Ser. No. 701,497, May 16, 1991, Pat. No. 5,224,346.

[51] Int. Cl.⁶ ................................................. F01N 3/28
[52] U.S. Cl. ................................ 60/286; 60/301; 60/305
[58] Field of Search ............................. 60/286, 301, 305

[56] References Cited

U.S. PATENT DOCUMENTS 3,779,014  12/1973  Nohira ........................................ 60/309
4,196,170   4/1980  Cemenska ................................... 60/301
4,403,473   9/1983  Gladden ..................................... 60/286

FOREIGN PATENT DOCUMENTS 2145240  3/1973  Germany ................................... 60/286

*Primary Examiner*—Douglas Hart
*Attorney, Agent, or Firm*—Freilich Hornbaker Rosen

[57] ABSTRACT

A method and apparatus are provided for reducing pollutants and especially nitrogen oxides, or NOx, in the exhaust gases of an engine. The apparatus includes a device for injecting ammonia into a conduit that extends between cylinder exhaust valves and a catalytic converter, to mix the ammonia with the exhaust gases. Ammonia injection occurs at a location a plurality of inches downstream of the exhaust valves to avoid burning of the ammonia by flames. The injection preferably occurs at a location where the exhaust gases are at a temperature of at least about 1200° F. to cause considerable reaction of the ammonia with NOx in the exhaust gases prior to the gases reaching the catalyst, so less NOx must be removed along the catalyst. To minimize ammonia use, it is injected only for a limited period such as a minute after a cold engine is started when the catalyst is too cold to cause significant reactions, and during operation of the engine at high power levels when the greatest amounts of NOx are produced.

2 Claims, 1 Drawing Sheet

X AIR ON    1981 CADILLAC SEVILLE
o AIR OFF   50 MPH NORMAL LOAD

ENGINE NOX REDUCTION

CROSS-REFERENCE TO RELATED PATENT

This is a Continuation-in-Part of U.S. Pat. No. 5,224,346 issued Jul. 6, 1993 on application Ser. No. 07/701,497 filed May 16, 1991.

BACKGROUND OF THE INVENTION

Engines produce a variety of pollutants, including nitrogen oxides (nitric oxide or NO and nitrogen dioxide or $NO_2$, both of which may be referred to as NOx). The NOx and unburned hydrocarbons often are considered as the worst contributors to pollution of city air. Automobile gasoline engines currently include a CCD (catalytic converter device) containing a catalyst of the platinum group, and connected through an elongated conduit to the exhaust valves of the engine cylinders. The platinum based CCD's cause a reaction between NOx and carbon monoxide, to produce nitrogen and carbon dioxide, both being substantially benign. Such CCD's are effective only when heated to a temperature of at least 350° F. to 400° F., and generally operate at a temperature of about 700° F. or more when the engine has been completely heated after several minutes of running time.

Gasoline engines are run at stoichiometric conditions or with a few percent too little air to minimize the production of NOx. Although the engine could be run lean wherein additional air was introduced into the cylinder, to reduce unburned hydrocarbons, this would result in preferential reaction of oxygen with carbon monoxide, which hampers the reaction of carbon monoxide with nitrous oxide in the catalyst. Even with stoichiometric operation and the CCD's, significant amounts of NOx are released, and proposed legislation will require further reductions in the future. A practical system which further reduced NOx emission, and which even allowed further reductions in unburned hydrocarbon emissions, and which could be utilized with currently available platinum group-based catalytic converters, would be of considerable value. If such a system reduced oxides of nitrogen emissions, it could enhance the acceptability of diesel engines which, though highly efficient, have become unacceptable because of high emissions of oxides of nitrogen.

The present invention reduces pollution by injecting ammonia into the conduit that couples the fuel-burning cylinders or other power-generating portion of an engine, to the catalytic converter. The use of ammonia injection to remove NOx has been proposed in the past. U.S. Pat. No. 3,449,063 by Griffing et al describes the injecting of ammonia into engine exhaust gases, to flow through a copper oxide or copper oxide-palladium catalyst. U.S. Pat. No. 3,599,427 by Jones describes an engine with two catalyst stations, the first being a copper oxide catalyst which removes carbon monoxide and hydrocarbons, and with the second catalyst being of the type which includes a noble metal such as platinum. After the exhaust gases pass through the copper oxide catalyst, they are cooled to about 700° F., before ammonia is injected into the exhaust gases to pass with them through the second catalyst containing noble metal. The systems of these patents require considerable modification of an engine, both requiring the addition of a copper oxide based catalyst operating at a high temperature and not efficiently using the injected ammonia. Applicant's system efficiently uses injected ammonia, and can be easily used with present engine systems or easily retrofitted to existing engines.

SUMMARY OF THE INVENTION

In accordance with one embodiment of the present invention, a system is provided for reducing pollution, especially nitrogen oxides, or NOx, in the exhaust gases of an engine by injecting ammonia therein, which minimizes the amount of injected ammonia while maximizing its effect, with minimal change to present engine designs that use noble metal catalytic converters. The apparatus includes a device for injecting ammonia into a conduit that couples a power-generating portion of an engine where exhaust gases are created, to a noble metal CCD (catalytic converter device). The injection preferably occurs at a location where the exhaust gases have a temperature of at least 1200° F. The ammonia vigorously reacts with nitric oxide at a temperature of at least 1200° F., even in the absence of any catalyst, to greatly reduce nitric oxides even before the exhaust gases reach the noble metal CCD, where additional reaction occurs. The injection occurs a plurality of inches downstream from the engine cylinders or other power-generating portion to isolate the ammonia from open flames or other localized locations where the exhaust temperature might be above 1800° F., at which temperature the ammonia burns and creates nitric oxide. Applicant prefers to inject ammonia at a location of highest temperature, provided it never exceeds 1800° F., to obtain the most vigorous reaction with nitric oxides and for the maximum period of time.

Injection of ammonia is controlled by an ammonia injection control which injects ammonia only when the engine is operating at a high power level when most of the NOx is produced, but not when a hot engine is operating at a low power level when emission of NOx is very low. The control also injects ammonia during perhaps a minute following start up of a cold engine, when the catalytic converter has not heated up to at least about 350° F. to 400° F. and is therefore not effective, to avoid large emissions of NOx at this time. The ammonia reacts with nitric oxide in the presence of oxygen, as compared to present noble metal catalytic converters that can react carbon monoxide with nitric oxide only if there is little or no oxygen present. This allows the engine to run lean, and enables a catalytic converter to be effectively used on diesel engines or other lean operating engines to reduce NOx.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
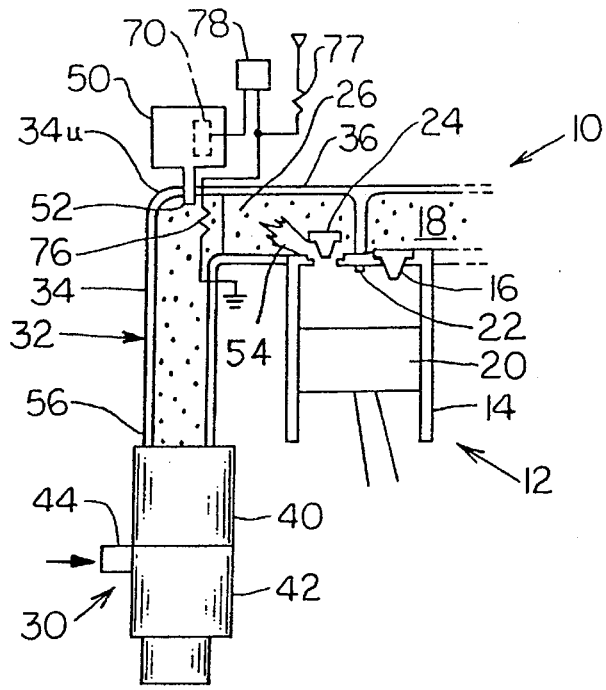
FIG. 1 is a simplified schematic diagram of a portion of an engine, with the pollution reduction apparatus of the present invention installed thereon.

FIG. 1 illustrates a portion of a common automobile gasoline engine 10 which includes a power-generating portion 12 that has a group of perhaps four to eight cylinders 14 having inlet valves 16 through which a fuel air mixture 18 is admitted. Pistons 20 compress the fuel air mixture, and sparks from spark plugs 22 ignite the mixture to "burn" it and create power. Exhaust valves 24 open in each cycle to expel exhaust gases 26 that travel from each exhaust valve 24 along a conduit 32 to a catalytic converter device 30. The conduit includes a manifold 34 that connects to upstream portions 36 of the conduit that extend to an exhaust valve of each individual cylinder. Each upstream portion 36 is a separate tube that connects an exhaust valve to the upstream end 34u of the manifold. After passing through the catalytic converter device 30, the exhaust gases may pass directly into the atmosphere. The exhaust gases emerging from the exhaust valve 24 contain three major types of pollutants, these being nitric oxide (NO), carbon monoxide (CO), and unburned hydrocarbons (symbolized as HC). Generally, the most difficult pollutant to reduce is nitrogen oxide, which is created as nitric oxide (NO) and which may later oxidize to become nitrogen dioxide ($NO_2$).

The CCD (catalytic converter device) 30 includes two stages 40, 42, the first stage 40 being previously used to reduce the amount of NO (nitrogen oxide) and the second stage 42 being previously used to reduce CO (carbon monoxide) and HC (unburned hydrocarbons). The CCD uses noble metals, primarily of the platinum group, as a catalyst. In the first stage 40, the catalyst previously reacted CO and NO to produce $CO_2$ (carbon dioxide) and $N_2$ (nitrogen), both of which are relatively harmless. To cause this reaction, it is necessary that no excess $O_2$ (oxygen) be present, or else CO will react with $O_2$ instead of with NO so the amount of NO will not be reduced. To assure that no excess $O_2$ is present, the engine is operated at the stoichiometric fuel-air ratio or slightly "rich" (excess fuel).

In the second stage 42 of the catalytic converter device, excess air is admitted through an air inlet 44 to mix with the exhaust gases as they pass through additional areas of the device that are coated with noble metal. In the second stage 42, the excess $O_2$ in the additional air reacts with CO to produce $CO_2$ and reacts with HC (unburned hydrocarbons) to produce $CO_2$ and water.

Although the presently used catalytic converter devices greatly reduce pollutants, they have many disadvantages. One disadvantage is that the amounts of NO emitted are still too high. Another disadvantage is that they do not work well with diesel engines, where there is excess air resulting in excess $O_2$ that prevents the first stage of the catalytic converter device from efficiently reducing NO. Although ordinary gasoline engines can run well at stoichiometric fuel-air ratios, somewhat greater efficiency could be obtained if such engines could be allowed to run lean (considerable excess air), but the excess $O_2$ would prevent the first stage of the catalytic converter device from operating efficiently.

In accordance with present invention, NO as well as CO and HC are reduced considerably, in an engine using ordinary commonly used catalytic converter devices, with only a small addition to the engine. The addition comprises a device 50 coupled to the conduit 32 that connects the exhaust valves 24 to the catalytic converter device 30, which stores ammonia and injects it into the conduit. As is known in the prior art ammonia ($NH_3$) reacts with NO to produce $N_2$ and water ($H_2O$). Such reaction occurs rapidly in the absence of a catalyst, at temperatures of about 1200° F. and higher. The exhaust gases emitted from the exhaust valve 24 have a bulk (average) temperature of about 1300° F., the temperature varying with the engine load. The temperature of the exhaust gases decreases along the conduit 32. Applicant injects the ammonia at a location 52 which is generally closer to the exhaust valve than to the CCD (catalytic converter device), so the reaction occurs where the temperature is at least about 1200° F. to cause the reaction of $NH_3$ and NO to produce $N_2$ and water. Although the reaction of $NH_3$ and NO in the conduit 32 significantly decreases NO, there is still considerable NO remaining, which is further reduced in the CCD 30.

As mentioned above, both stages of the CCD 30 include large areas coated with noble metal. When that noble metal is heated to a temperature of at least about 350° F. to 400° F., it causes a reaction of $NH_3$ and NO to produce N and water. It is noted that the CCD device commonly heats to a steady state temperature (the bulk temperature of exhaust gases passing therethrough) of about 700° F. to 1000° F. after the engine has been running for several minutes. Applicant utilizes the noble metal catalyst of the CCD to cause further reactions of the ammonia with nitric oxide to further reduce nitric oxide. Thus, applicant reacts ammonia with the exhaust gases to reduce nitric oxide, both when there is no catalyst but the exhaust gases are at a temperature of at least about 1200° F., and also where there is a catalyst of noble metal where the reaction can occur at a lower temperature.

Initially, applicant experimented with injecting ammonia into the upstream end of the conduit 32 where it connects to the exhaust valve 24. However, applicant found that this produced higher levels of nitric oxide than in the absence of ammonia injection. Applicant believes that this occurs because of the presence of flames indicated at 54 that sometimes pass a small distance through the exhaust valve. At temperatures of about 1800° F. and higher, ammonia reacts with oxygen to produce nitric oxide. Although the bulk temperature of the exhaust gases at the exhaust valve 24 may be about 1300° F., there can be localized hot spots due to flames, which can increase the temperature beyond 1800° F. to produce the unwanted production of nitrous oxide. Accordingly, applicant places the injection location 52 a plurality of inches downstream from the extreme upstream end of the conduit where it connects to the exhaust valve.

In some engines, the exhaust gases exiting the power-generating portion of the engine may be at a temperature significantly below about 1200° F., such as at 1150° F. or lower, and yet significant NOx may be generated. One example is a diesel engine, in which excess air is highly compressed when fuel is injected in the cylinder, so high temperatures are produced that result in considerable NOx. However, the subsequent large expansion of the exhaust gases in the cylinder can result in a lower temperature at the cylinder exhaust valve. The injection of ammonia in such exhaust gases upstream from a CCD (catalytic converter device), is still useful to obtain mixing of the ammonia and exhaust gases and some reaction of them upstream of the CCD. However, in that case, most of the reaction and NOx reduction occurs in the CCD. The injection should occur where the exhaust gases are hottest, but where their temperature is never well over 1800° F. Thus, ammonia is preferably injected at a location where the exhaust gas temperature is sometimes between 1200° F. and 1800° F. (preferably closer to 1800° F.).

As mentioned above, the reaction of $NH_3$ and NO to produce $N_2$ and water, occurs even in the presence of excess oxygen. Accordingly, applicant can allow excess oxygen to flow through the entire length of the CCD 30, to utilize the entire length of the catalyst to reduce CO and HC by combining them with oxygen. This makes more efficient use of the catalyst in reducing carbon monoxide and unburned hydrocarbons. The excess air can be injected at the upstream end of the CCD at 56. Excess air also can be added directly into the exhaust manifold if the oxygen sensor used with most modern engines can be isolated from the added oxygen or a different engine control is used. Excess air also can be introduced by running the engine lean (preferably more than 10 percent more air than at stoichiometric), so that there is considerably more air than required for a stoichiometric fuel air ratio.

The ability to run an engine with considerably more air than for a stoichiometric fuel-air ratio has several advantages. One advantage is that it can result in more complete burning of the fuel, resulting in somewhat better mileage for a vehicle and the production of less unburned hydrocarbons and less carbon monoxide. It is noted that operating an engine slightly lean produces more NO than stoichiometric, but as the amount of excess air increases (e.g. more than ten percent above that at stoichiometric) the amount of NO drops dramatically, to a level less than that produced at stoichiometric. In addition, as mentioned above, operating an engine lean reduces unburned hydrocarbons and carbon monoxide, and is more efficient.

The ability to run an engine lean, enables operation of diesel engines without producing excess amounts of nitrogen oxides. The control of nitrogen oxides in a diesel engine is very difficult with current techniques, because diesel engines inherently operate lean. In fact, steps are being taken to phase out use of diesel engines if nitrogen oxide emissions cannot be significantly reduced. The use of ammonia injection to reduce NO, both along the conduit where the exhaust gases are hot and also along the CCD device, despite the presence of excess air, enables the control of NO in diesel engines. Also, the fact that both sections of current CCD's can be used in the reduction of unburned hydrocarbons, enables considerable reduction of unburned hydrocarbons, which is another present deterrent to the use of diesel engines.

Figure 3:
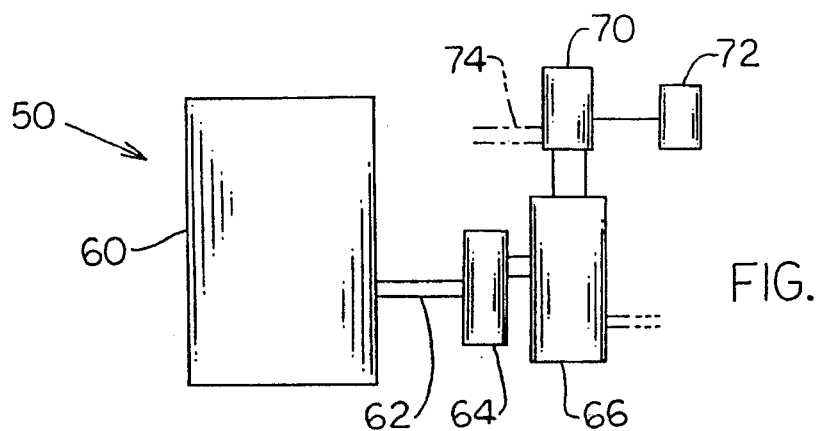
FIG. 3 is a side view of the injector of the engine of FIG. 1.

FIG. 3 illustrates some details of the ammonia injection device 50 which injects ammonia into the conduit connecting the engine exhaust valves to the CCD. The device 50 includes a storage unit 60 for ammonia, such as a pressurized gas canister. The unit is connected by a pipe 62 to a gas shut off valve 64 which stops the flow when the engine is off but opens when the engine is on. The unit also includes a gas metering valve 66 operated by an actuator 70. The actuator 70 is controlled by a control 72 which senses operation of the engine (by electronic or pneumatic sensors), to control the amount of ammonia injected. Nitrogen oxides are produced primarily when the fuel air mixture burns at a very high temperature such as above 2500° F. This occurs primarily when the engine is operating under a heavy load, as when a vehicle is accelerating, moving up a steep hill, or traveling at high speeds. When the engine is operating at low to moderate loads, very little nitrogen oxide is produced. Applicant minimizes the amount of ammonia required, by injecting the ammonia when the engine is operating at a high load condition (preferably between about 20 per cent and 100 per cent of maximum power output or fuel flow rate of the engine), but not injecting ammonia when a warmed engine is operating at low loads (preferably when the engine output is less than about 20 per cent of maximum power output or fuel flow rate of the engine).

Applicant injects ammonia when the engine is operating at over 80 percent of its maximum power output range, or the flow rate of fuel is over 80 percent of its maximum, and generally when it is operating at over perhaps 25 percent of its maximum power output. However, applicant does not inject ammonia when the engine is operating at less than 5 percent of its maximum output (e.g. when idling or low speed cruising) for a fully heated engine, or when the fuel flow rate is less than 5 percent of maximum for a heated engine. Applicant also injects ammonia during a short period after a cold engine has been started. During this period after the cold engine has been started, the CCD is too cold to cause reactions that would significantly reduce nitrogen oxides. After the engine has operated for perhaps two minutes, the CCD will be heated to a temperature of about 350° F. to 400° F., when the CCD is warm enough to cause significant nitric oxide reductions by reacting $NH_3$ with NO. During this warmup period of perhaps two minutes, however, the exhaust gases are substantially as hot as they will be during operation in a fully heated engine, and applicant injects ammonia during this warmup period to cause the reaction of ammonia with nitric oxide in the hot exhaust gases, even though the reduction does not proceed vigorously later in the presence of a functioning catalyst. Applicant prefers to inject ammonia during a period of at least about 15 seconds after a cold engine has been started.

The control 72 of the ammonia injection device can sense when the engine is operating under heavy load, by measuring any of a number of parameters of engine operation. The control can measure the power output of the engine, by the manifold pressure which is a direct measure of power output at any engine speed, and thus a measure of nitrous oxide formation. The injection device can be directly pneumatically controlled as through a pressure-vacuum line indicated at 74 or the control can be accomplished electrically. A variety of pneumatic and electrical sensors can be used to determine when the engine is cold and when the engine is operating at a high power level.

An accurate measure of the formation of nitric oxide can be obtained by measuring the temperature of exhaust gases as at the upstream end of the exhaust manifold. Exhaust temperature is a direct (exponential) measure of nitric oxide production. FIG. 1 shows a temperature sensor such as a resistor 76 whose resistance changes with temperature. The output of the resistor, such as the voltage at one end when a current from a voltage source flows through it and a constant resistance 77, is delivered to a circuit 78 that controls the actuator 70 of the injection device. The injection of ammonia can be controlled to be substantially proportional to the production of NOx, to most efficiently use the ammonia.

Figure 2:
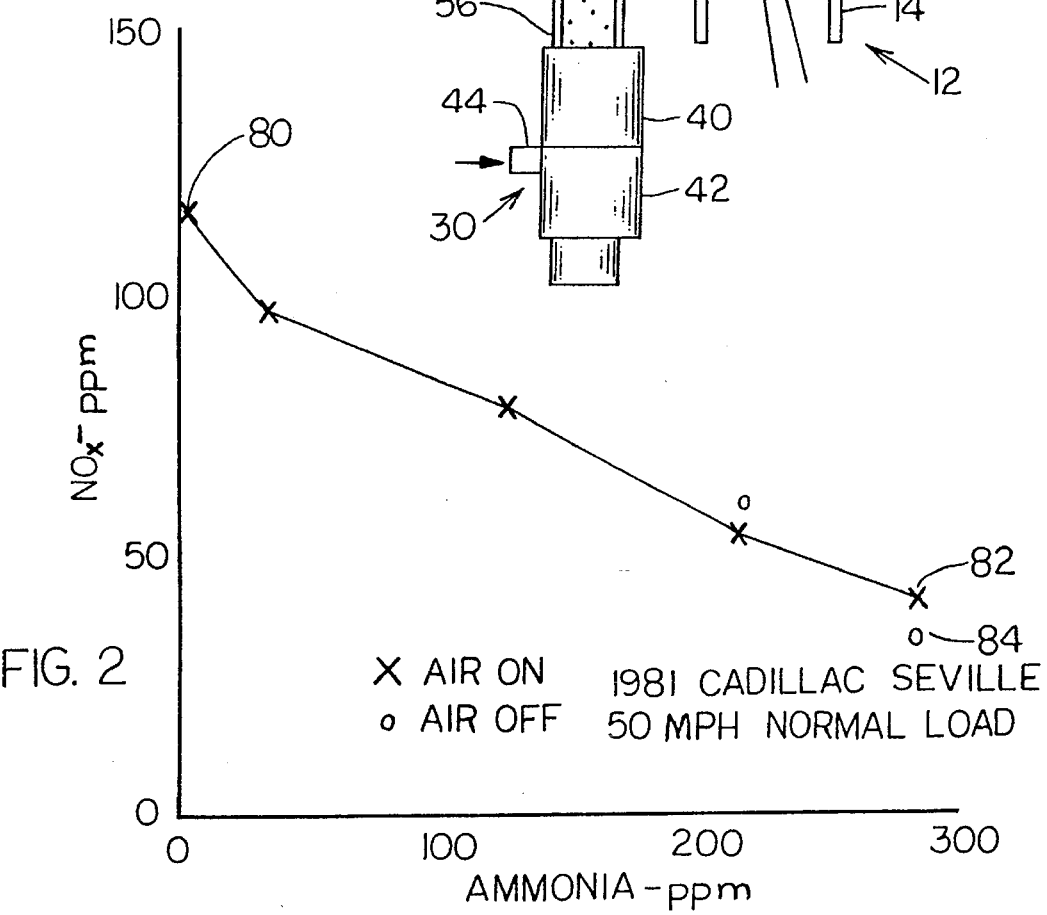
FIG. 2 is a graph showing variation in nitrous oxides with injected ammonia in a test conducted by applicant.

Applicant has conducted tests to determine the amount of reduction of nitrous oxide in the final exhaust of an engine, with FIG. 2 indicating the tests results. A test was conducted on a 1981 Cadillac Seville, 365 cubic inch engine, which operated on 4, 6, or 8 cylinders. Ammonia was injected 12 inches upstream of the catalytic muffler. FIG. 2 illustrates the variation in nitric oxide with the rate of injection of ammonia, when the engine was operated at a load representing the Cadillac traveling at a constant speed of 50 miles per hour (which represents about 50 percent of the maximum of the engine output at this engine speed). When no ammonia was injected, the level of nitric oxide at point 80 on the graph was about 115 ppm (parts per million) in the final exhaust gas emitted into the atmosphere. At the point 82, when ammonia was injected at a rate which resulted in ammonia being present at about 280 ppm in exhaust gases, the nitric oxide emissions had dropped to about 40 ppm, or to about one third the level when no ammonia was injected. At the point 84, when ammonia was present at 280 ppm, but the air hose to the second stage catalyst was disconnected, the amount of nitric oxide decreased slightly from about 40 ppm to about 35 ppm.

The tests indicate that the amount of ammonia that should be injected for considerable NOx reduction is on the order of twice the amount of NOx present in the final exhaust when no ammonia is present. Since the amount of NOx present without ammonia injection is small, the ammonia is used up at a low rate. Applicant estimates that a three pound supply of ammonia would last during travel of about 3,000 miles in an average automobile, and would last about twice as long if injected only at moderate to high loads. The ammonia can be stored as a liquid, and injected at a pressure of about five to ten psi (which is greater than maximum exhaust manifold pressure of about two psi).

The ammonia injection of the present invention is useful for a variety of engines, including ordinary gasoline auto engines, diesel engines, and turbine engines, used for a variety of vehicles and in stationary installations.

Thus, the invention provides a method and apparatus for reducing engine pollution, which can use ordinary presently-used catalytic converter devices to further reduce pollutants, especially nitric oxide but also carbon monoxide and unburned hydrocarbons. The apparatus includes a device for injecting ammonia into the conduit which couples the exhaust valves of the power-generating portion of the engine to the catalytic converter device that utilizes a catalyst that is usually of the platinum family. The ammonia is injected at a location where the exhaust gas is a maximum, and preferably at least about 1200° F., so the ammonia reacts vigorously with nitrous oxide even in the absence of a catalyst. The platinum group catalyst lying downstream of the conduit, causes a further reaction of ammonia with the nitric oxide to further reduce the amount of it. Such reduction occurs even in the presence of oxygen, so excess oxygen can be used along the entire length of the catalyst to further reduce carbon monoxide and unburned hydrocarbons. The excess oxygen can be obtained by running the engine lean, so the apparatus is useful for diesel engines and enables gasoline engines to be run lean. The rate at which ammonia is used is minimized by injecting ammonia only when the engine is running at least moderate load conditions in a warmed engine, which is when most nitric oxide is produced. Ammonia may also be injected during a limited period after a cold engine is started, when the catalytic converter device is not effective, to reduce nitrous oxide at that time.

Although particular embodiments of the invention have been described and illustrated herein, it is recognized that modifications and variations may readily occur to those skilled in the art, and consequently, it is intended that the claims be interpreted to cover such modifications and equivalents.

We claim:

1. Apparatus for use with an engine having a power-generating portion that burns a hydrocarbon fuel and air and produces hot exhaust gases, having a catalytic converter device that includes a catalyst for enhancing reactions of components of said exhaust gases, and having a conduit that couples said power-generating portion to said catalytic converter device, for reducing pollution in the exhaust, comprising:

a device coupled to said conduit, which stores ammonia and injects it into said conduit at an inject location, to mix with said hot exhaust gases and pass with them along said conduit and then through said catalyst;

said power-generating portion comprises a plurality of cylinders in which said fuel and air are burned, a mechanism for applying fuel and air to said cylinders, and a plurality of exhaust valves through which burned fuel and air is exhausted and which are connected to said upstream end of said conduit, said conduit including a manifold which includes a chamber that is connected to a plurality of said exhaust valves and a downstream conduit portion which connects said manifold to said catalytic converter device;

said inject location lies in said manifold to lie spaced from said exhaust valves but at a location where exhaust gases are very hot.

2. A low pollution engine comprising:

a power-generating engine portion that burns a hydrocarbon fuel and air and produces hot exhaust gases;

a catalytic converter device which includes a catalyst;

a conduit with an upstream end connected to said exhaust valves and a downstream end connected to said catalytic converter device;

a controllable ammonia injecting device which is coupled to said conduit and which stores ammonia and injects it at a controllable rate into said conduit to mix with said exhaust gases;

said power-generating engine portion includes a plurality of cylinders in which said fuel and air is burned, and a plurality of exhaust valves each coupling one of said cylinders to the upstream end of said conduit;

said conduit includes a manifold having an upstream end connected to a plurality of said exhaust valves and a downstream end, and a tube connecting said downstream end to said catalytic converter device;

said injecting device is positioned to inject ammonia into said upstream end of said manifold.

* * * * *